(No Model.) 2 Sheets—Sheet 2.
C. P. MOSHER & N. R. STREETER.
MIRROR.
No. 542,594. Patented July 9, 1895.
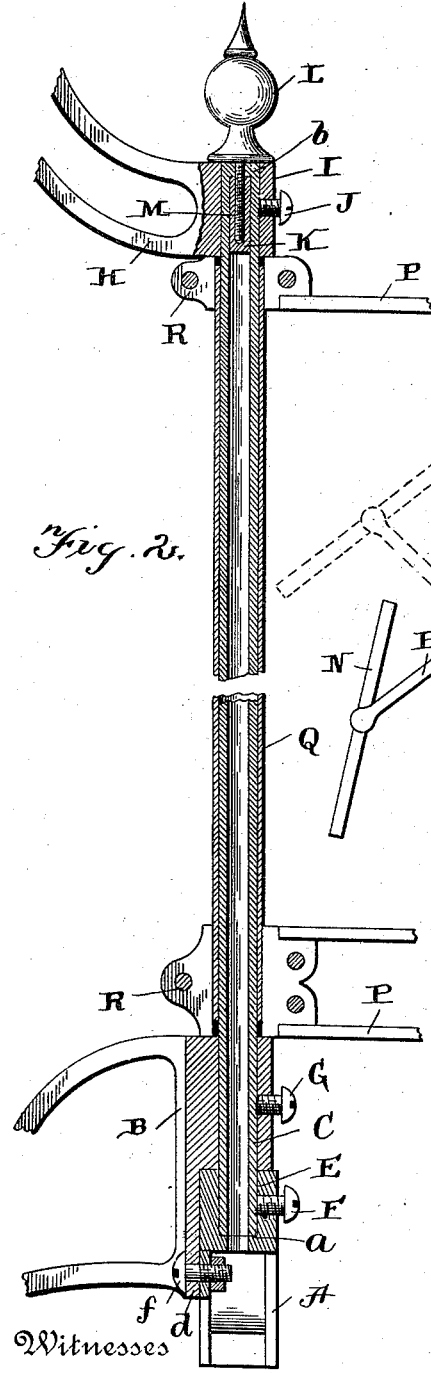
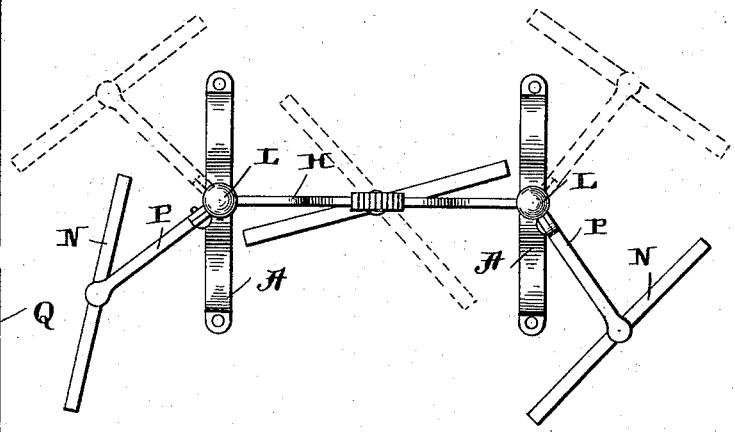
Witnesses
Geo. E. Frech
James W. Bevans
Inventors:
C. P. Mosher
N. R. Streeter
By their Attorneys
Pattison & Nesbit

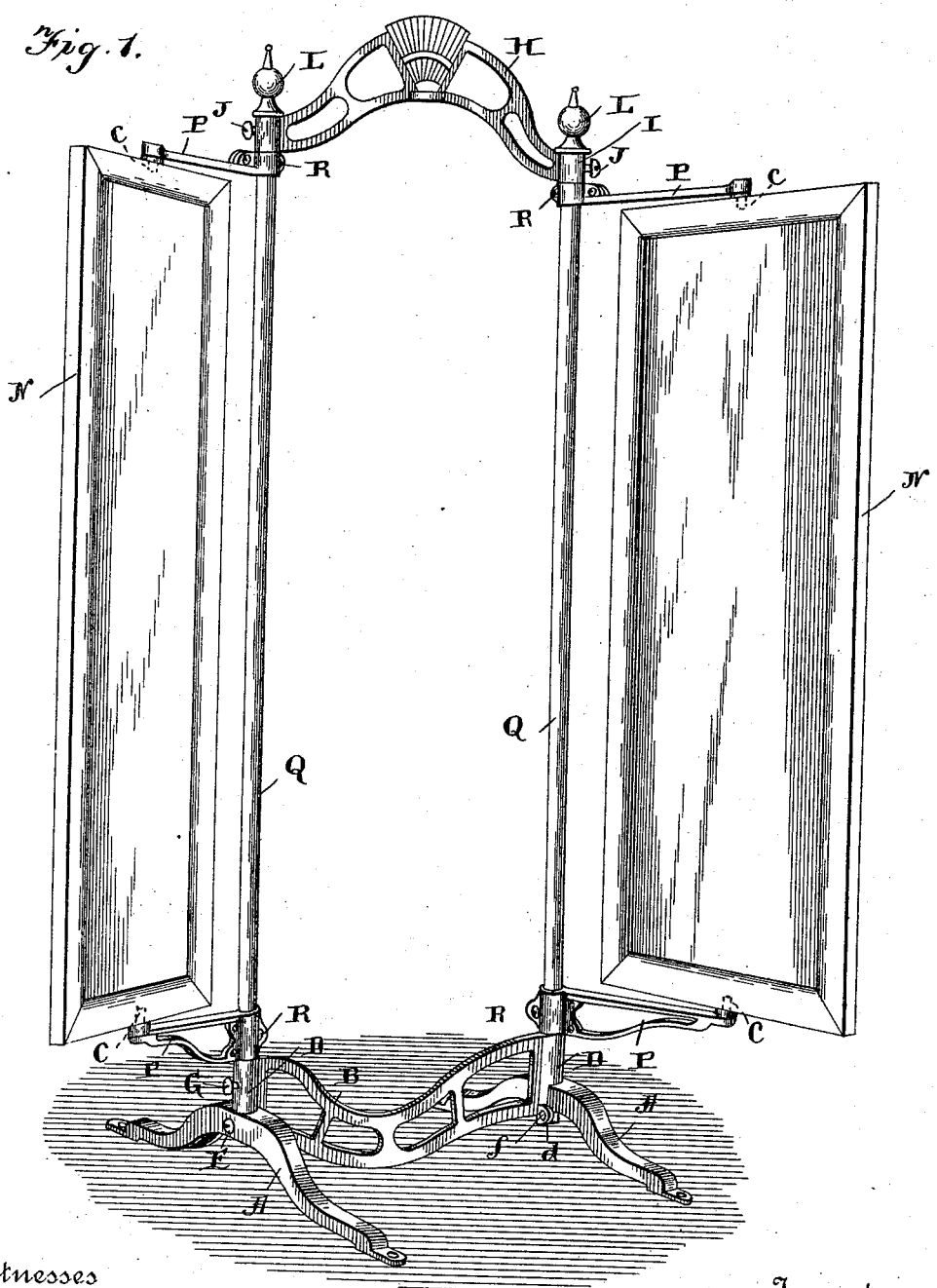

UNITED STATES PATENT OFFICE.

CHARLES P. MOSHER AND NELSON R. STREETER, OF GROTON, NEW YORK.

MIRROR.

SPECIFICATION forming part of Letters Patent No. 542,594, dated July 9, 1895.

Application filed September 7, 1894. Serial No. 522,369. (No model.)

*To all whom it may concern:*

Be it known that we, CHARLES P. MOSHER and NELSON R. STREETER, of Groton, in the county of Tompkins and State of New York, have invented certain new and useful Improvements in Mirrors; and we do hereby declare the following to be a full, clear, and exact description of the invention, such as will enable others skilled in the art to which it pertains to make and use it, reference being had to the accompanying drawings, which form part of this specification.

Our invention relates to improvements in mirrors; and it consists in the construction and arrangement of parts, which will be fully described hereinafter, and particularly pointed out in the claims.

The primary object of our invention is to provide a large standing mirror having an open framework, to the sides of which are hinged mirrors, which can be swung around the open frame and used at either side thereof, or the glasses fixed within the open frame facing in opposite directions or closed together with their faces inside, or one turned within the open frame and the other turned at any angle at one side thereof. The advantages of this construction are that the said mirror can be set in an aisle and the mirrors passed through the open frame to be used at either side of the frame, or persons may pass freely back and forth through the frame, thus requiring less room for the manipulation of the mirror, and which vertically takes up little or no room owing to the said open frame. The mirror can also be used in close places in which a mirror with a closed frame could not be used, and at the same time it is capable of being used from either side by passing the mirrors through the said open frame.

Another object of our invention is to provide hinges for carrying the mirrors, which will hold the mirrors at all times perpendicular and will not have any swinging or swaggering movement, so common in mirrors of this class.

Another object of our present invention is the particular manner of connecting the side upright of the open frame, the feet, and the stretcher, whereby a very simple, rigid, and neat construction is produced.

In the accompanying drawings, Figure 1 is a perspective view of a mirror which embodies our invention complete. Fig. 2 is a vertical sectional view of one side of the mirror. Fig. 3 is a plan view of the same, the mirrors being shown in several positions in dotted lines.

Reference being made to the drawings, A indicates the base or feet of the framework, and B the stretcher or bridge at the lower end of the framework, and which connects the said feet A. The sides of the framework consist of the vertical gas-pipes C, which have their lower ends passed through sockets B, formed on opposite ends of the lower stretcher B and into the sockets E formed in the feet A. These sockets E are provided with the shoulders or offsets *a*, which form stops for the lower ends of the gas-pipe C, so that they are placed within the said sockets and pushed downward upon the said shoulders, thus making their adjustment within the said sockets always the same, and these gas-pipes C are then clamped within the said sockets by means of the set-screws F. The said gas-pipes C are also clamped within the sockets E, at opposite ends of the stretcher B by means of the set-screws G, and this arrangement of connecting the feet and the vertical gas-pipes C with the bridge or stretcher B forms a very rigid and simple assemblage of the parts.

The upper ends of the gas-pipes C are connected by means of the upper arch or section H, which is provided at opposite ends with the sockets I for the reception of the upper ends of the said gas-pipes, and these sockets I are provided with the shoulders or offsets *d* for abutting against the upper ends of the said gas-pipes and making the adjustment of the upper part H always accurate, as will be readily understood. Passing through the sockets I of the upper arch H are the set-screws K, which clamp the said arch to the gas-pipes, as clearly shown in the drawings. As a means of ornamentation and finish for the upper ends of the gas-pipes and the ends of the arch H we place a wood plug J within the upper ends of the gas-pipes C and attach a knob L to the said wood plug by means of a screw M, as clearly shown.

From the above description it will be seen that we have produced a very simple open framework for supporting the two mirrors N. These mirrors N are centrally pivoted at their upper and lower ends upon the outer ends of the arms P, the said arms P having lugs *p* projecting into sockets upon the upper and lower ends of the frame of the mirrors N.

Surrounding the gas-pipes C are the brass tubes Q, to which the inner ends of the arms P are rigidly clamped by the screws R, the said inner ends of the arms being made in two parts for this purpose. From this description it will be seen that the tubes Q and the arms P being rigidly connected are virtually one piece, so far as the operation of the invention is concerned. Owing to this construction we produce a rigid supporting U-shaped frame in which the mirrors N are centrally pivoted, as before described. By this construction we prevent all lateral or swaggering movement at the upper and lower ends of the mirrors, which is so common in large mirrors of this class where the inner ends of the arms P merely surround either a tube or a bar and are not connected by means of a tube, as here shown.

The space between the tubes Q is sufficient to permit the passage therethrough of either of the mirrors N, and it will be seen that these mirrors can be freely swung around through the said space and used from either side of the framework, as may be convenient. It will also be seen that the person using the mirror, or any one passing by the mirror, may pass through between the side bars or tubes Q, so that the mirror is not in the way when placed in an aisle or when surrounded by goods or other objects. A person passing it is not required to pass around the mirrors or to move them to permit them to pass around, but can freely pass through the open framework, as will be readily understood. So also goods and other objects, such as counters, &c., may be at the sides of the mirrors, so that they can not be swung around outside, and yet the mirrors can be reversed to the opposite side by passing them through the open framework, so that surrounding objects do not interfere with the operation of the mirrors; also, owing to the fact that these mirrors can be freely swung around to either side of the framework, either around the outside of the side bars thereof or through the center thereof, they may be placed back to back between the side bars, making a double outwardly-facing mirror, or they can be closed together face to face, when desired, or one of them can be placed between the side bars of the frame and the other placed in any desired relation thereto, as will be readily understood. Numerous operations and positions of these mirrors can be obtained, which are needless to mention here, the same being obvious, owing to the fact that the mirrors can be swung around the side bars of the open framework, as already described. The lower arch or bridge B is also bolted to the feet A by means of the ears *b* upon both the arch and the feet, through which the bolts *f* pass, as clearly shown in the drawings.

We have produced a very simple rigid construction of standing mirrors, which enables the mirrors to be swung around through the framework and placed in all sorts of relative positions through the medium of the tubes Q which are the full length of the mirror-frame, and connect the upper and lower arms P rigidly.

While we have here shown and described our mirror having an open frame, we wish it understood that a mirror can be centrally pivoted between the side bars of the framework, as shown in Fig. 3, to adapt it to be turned around and faced in either direction without departing from the spirit of our invention. In this instance the mirrors N will be revolved around the outside of the side bars of the framework to be used at either side thereof, and the central mirror turned upon its pivot to face in either direction desired, as will be readily understood, the main object of my present invention being the construction of the mirror-supports whereby they are adapted to be swung around to either side of the supporting-frame.

Having thus fully described our invention, what we claim, and desire to secure by Letters Patent, is—

1. In a floor mirror, a frame comprising a transverse arch at its lower end having feet extending laterally therefrom, upwardly extending side bars having their lower ends rigidly connected with said arch, tubes surrounding said side bars, an arch placed above the said tubes and connecting the upper ends of said rods, laterally projecting arms rigidly connected with said tubes and adapted thereby to swing freely around said side bars, and mirrors supported between said arms, substantially as described.

2. A mirror comprising a frame having side bars, a connecting arch or stretcher at the lower ends of the side bars, tubes surrounding, supported by, and rotatable independent of said bars, arms rigidly connected to opposite ends of the said tubes, the lower arms resting upon said arch, substantially as shown and described.

3. A mirror comprising the feet A having depending sockets, an arch or stretcher connecting the said feet and having a socket above and registering with the said feet sockets, side bars extending into the said stretcher sockets and into the feet sockets, an arch connecting the upper ends of the said side bars, and mirror frames supported upon the said side bars, substantially as specified.

4. A floor mirror comprising a rectangular open frame-work, tubes supported by and freely rotatable upon the side bars of said frames, upper and lower laterally extending arms rigidly connected to said tubes to form therewith mirror frames, said arms adapted to pass between and around the side bars, and mirror frames supported by said arms, substantially as shown and described.

5. A mirror comprising an open frame-work having vertical side bars, and mirror supporting frames having inner vertical tubes supported by and surrounding and rotatable independent of the said side bars and extending throughout the length of the said side bars, the mirror frames being of a height less than the distance between the horizontal portion of the open frame-work, and of a width less than the distance between the said side bars of the frame-work, whereby the mirror frames are adapted to swing through the said open frame or around the outside thereof, substantially as described.

In testimony whereof we affix our signatures in presence of two witnesses.

CHARLES P. MOSHER.
NELSON R. STREETER.

Witnesses:
ALBERT H. ANDRUS,
S. V. SMITH.